(12) United States Patent
McDaid

(10) Patent No.: US 11,629,750 B1
(45) Date of Patent: Apr. 18, 2023

(54) DOUBLE LOCKING SNAP HOOK

(71) Applicant: Sherrill, Inc., Greensboro, NC (US)

(72) Inventor: Cornelius McDaid, Randolph, MA (US)

(73) Assignee: Sherrill, Inc., Greensboro, NC (US)

(*) Notice: Subject to any disclaimer, the term of this patent is extended or adjusted under 35 U.S.C. 154(b) by 0 days.

(21) Appl. No.: 17/644,192

(22) Filed: Dec. 14, 2021

(51) Int. Cl.
*F16B 45/02* (2006.01)

(52) U.S. Cl.
CPC .......... *F16B 45/037* (2021.05); *F16B 45/023* (2021.05); *F16B 45/026* (2021.05); *F16B 45/028* (2021.05)

(58) Field of Classification Search
CPC .... F16B 45/023; F16B 45/024; F16B 45/026; F16B 45/028; F16B 45/037; Y10T 24/45366
See application file for complete search history.

(56) References Cited

U.S. PATENT DOCUMENTS

| | | | |
|---|---|---|---|
| 4,977,647 A | 12/1990 | Casebolt | |
| 5,579,564 A * | 12/1996 | Rullo | F16B 45/02 24/600.1 |
| 5,735,025 A * | 4/1998 | Bailey | F16B 45/02 24/600.1 |
| 6,283,523 B1 * | 9/2001 | Simond | F16B 45/02 24/600.1 |
| 6,283,524 B1 * | 9/2001 | Simond | F16B 45/02 24/600.1 |
| 8,007,015 B2 * | 8/2011 | Coulombe | F16B 45/02 24/600.1 |
| D680,420 S * | 4/2013 | Ellis | D8/367 |
| 8,499,423 B2 | 8/2013 | Yang | |
| 9,032,595 B2 | 5/2015 | Lin | |
| 9,518,600 B2 | 12/2016 | Lin | |
| 2008/0104809 A1 * | 5/2008 | Lin | F16B 45/02 24/600.1 |
| 2014/0110956 A1 * | 4/2014 | Lin | B66C 1/36 294/82.2 |
| 2021/0359391 A1 * | 11/2021 | Hong | F16B 1/0071 |
| 2022/0266074 A1 * | 8/2022 | Yang | F16B 45/023 |

OTHER PUBLICATIONS

International Safety Components Ltd., SH903 Triple Action Snap Hook Data Sheet, 2011.

* cited by examiner

*Primary Examiner* — Victor D Batson
*Assistant Examiner* — Amber Nicole Helms
(74) *Attorney, Agent, or Firm* — Altman & Martin; Steven K Martin

(57) ABSTRACT

A snap hook with front and rear locks that must be disengaged for the gate to open. The body has a base and a J-shaped hook. A gate has two parallel, spaced fingers extending from an end of a gate arm. As the gate pivots between open and closed positions, a stop pin extending between the arms and through a curved slot in the body slides within the curved slot. A front lock pivots between a locking position, where shoulders in the gate arms abut an edge on the front lock, preventing the gate from pivoting open, and an unlocking position, where the shoulder does not abut the front lock edge. The rear lock pivots between a locking position, where the curved slots on the rear lock are not aligned with body curved slot, and an unlocking position, where the curved slots are aligned, and the gate can pivot open.

9 Claims, 14 Drawing Sheets

DOUBLE LOCKING SNAP HOOK

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to snap hooks, more particularly, to snap hooks with a double locking mechanism.

2. Description of the Related Art

Snap hooks or carabiners have many different uses. The basic snap hook has a body with a hook that has an opening and a pivoting gate that, when closed, spans the opening. A locking snap hook has a latch that prevents the gate from opening inadvertently. Opening a locking snap hook is a two-step process: releasing the latch and opening the gate. A double locking snap hook includes a lock the prevents the latch from opening inadvertently. Opening the double locking snap hook is a three-step process: releasing the lock, releasing the second latch, and opening the gate. There are a number of double-locking snap hook designs.

BRIEF SUMMARY OF THE INVENTION

The present invention is a snap hook that has two locks to prevent inadvertent opening of the gate. Both locks need to be disengaged in order for the gate to open.

The snap hook has a body, a gate, a front lock, and a rear lock. The body has a base with a hook that extends away from the body and curves into a J shape. The gap between the free end of the hook and the base is the opening into the interior of the hook. Optionally, the base has a ring or other means for attaching other devices.

The gate is an arm with a pair of parallel fingers extending generally perpendicularly from the pivot end of the arm. The fingers are spaced apart to form a gap. A gate pivot pin extends through coaxial gate pivot holes through the fingers at the pivot end of the arm and a base pivot hole aligned with the gate pivot holes. The gate pivots on the pivot pin between a closed stop and an open stop at the ends of a curved slot. A stop pin between coaxial holes in the ends of the fingers extends through the curved slot. As the gate pivots, the stop pin slides within the curved slot. When at the closed end, the gate is in the closed position where the arm spans the hook opening. When the stop pin is at the opened end, the gate is in the open position where the arm is within the hook interior. A gate spring assembly biases the gate to the closed position.

The front lock has a body with two parallel side walls, a gap between the front lock side walls, and a front lock push wall connecting the side walls. The gap has a width such that the front lock straddles the base at the depressions, so that, when the gate pivots, the gate finger gap slides over the front lock as it slides over the base.

The front lock pivots on a pivot pin extending through holes in the side walls and a hole in the body between a lock stop, where the front lock is in a front locking position, and an unlock stop, where the front lock is in a front unlocking position. The front lock push wall hitting the base forms the unlock stop. Alternatively, the side walls hitting the edge of the depression forms the unlock stop. A front lock spring biases the front lock to the front locking position.

When in the front locking position, a top edge of the side walls is aligned with shoulders in the gate. When attempting to push the gate to the open position, the shoulders push against the top edges of side walls, preventing the gate from pivoting. When the front lock is pushed to the front unlocking position, the top edges are no longer aligned with the shoulders, and the gate can be pivoted to the open position.

The rear lock has an elongated body with two parallel rear lock side walls spaced apart by a gap and a rear lock push wall connecting the side walls. The body fits over the base and within the gate finger gap.

The rear lock pivots on a pivot pin extending through holes in the side walls and a hole in the body between a lock stop, where the rear lock is in a rear locking position, and an unlock stop, where the rear lock is in a rear unlocking position. The rear lock push wall hitting the base forms the unlock stop. A rear lock spring biases the rear lock to the rear locking position.

The side walls of the rear lock have coaxial curved slots. When the rear lock is in the rear locking position, rear lock curved slots are not aligned with base curved slot. Because the gate stop pin extends through both the base curved slot and the rear lock curved slot, when the curved slots are not aligned, the gate stop pin cannot move. When the rear lock is in the rear unlocking position, the rear lock curved slots align with the base curved slot, permitting the stop pin to slide within the slots and the gate can open.

In order to open the gate, both the front lock and the rear lock must be in the unlocking position.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
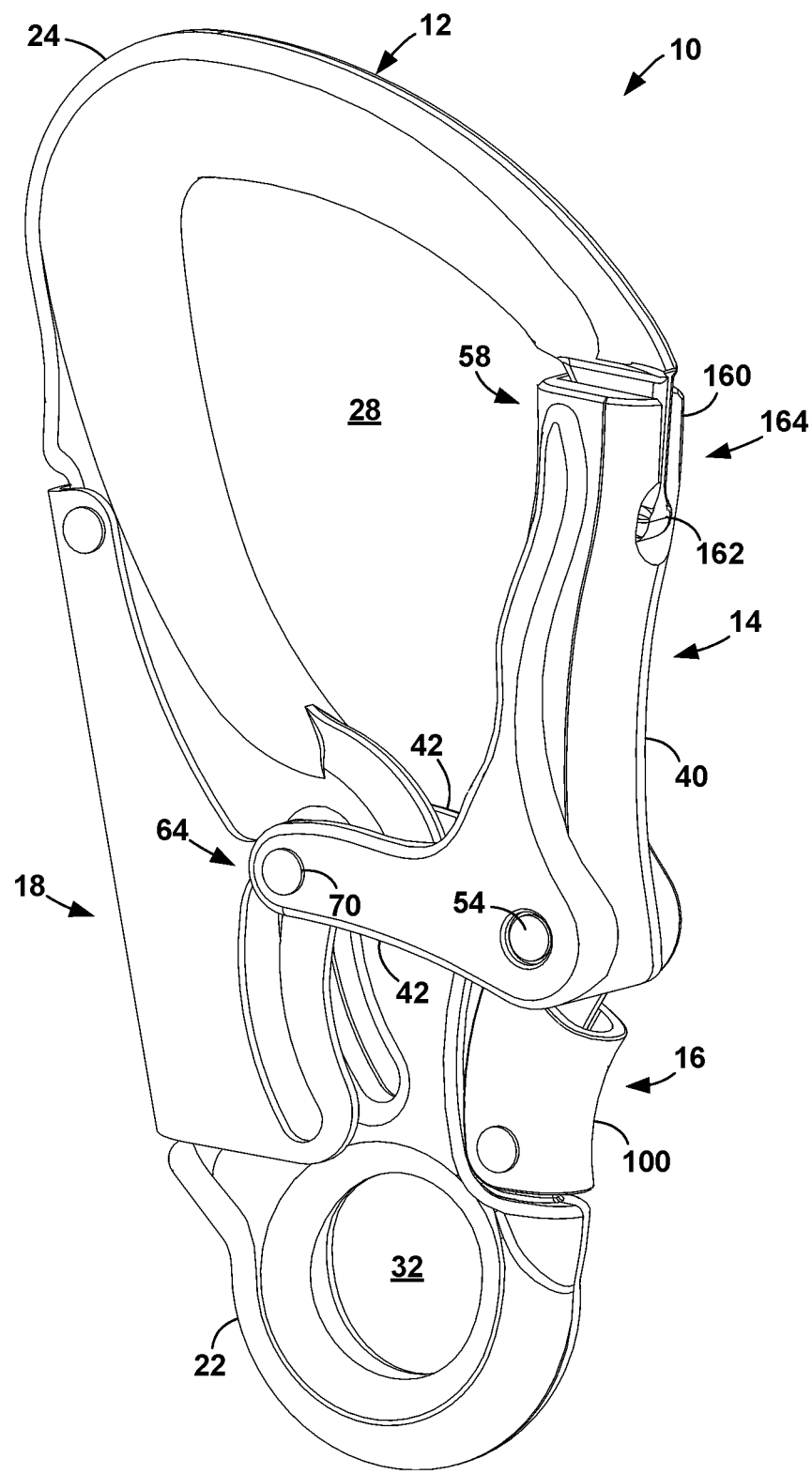
FIG. 1 is an assembled, perspective view of the snap hook of the present invention.

The double locking snap hook of the present invention is a snap hook that has two locks that prevent inadvertent opening of the gate. One lock is on the front of the snap hook and the other lock is on the back of the snap hook. Both locks need to be disengaged in order for the gate to open.

Referring to the figures, the double locking snap hook 10 has a body 12, a gate 14, a front lock 16, and a rear lock 18.

Figure 2:
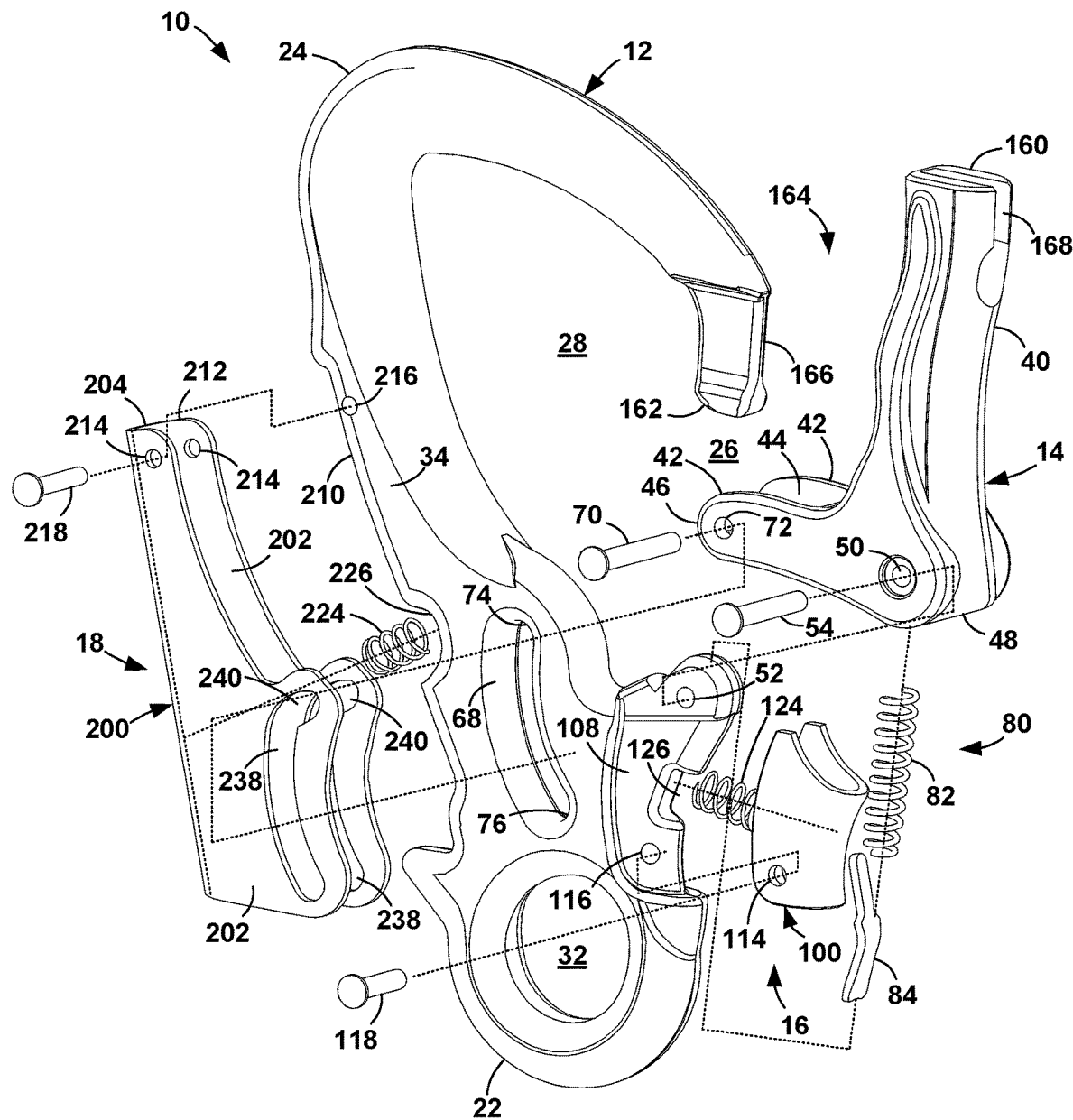
FIG. 2 is an exploded, front lock side, perspective view of the snap hook.
Figure 3:
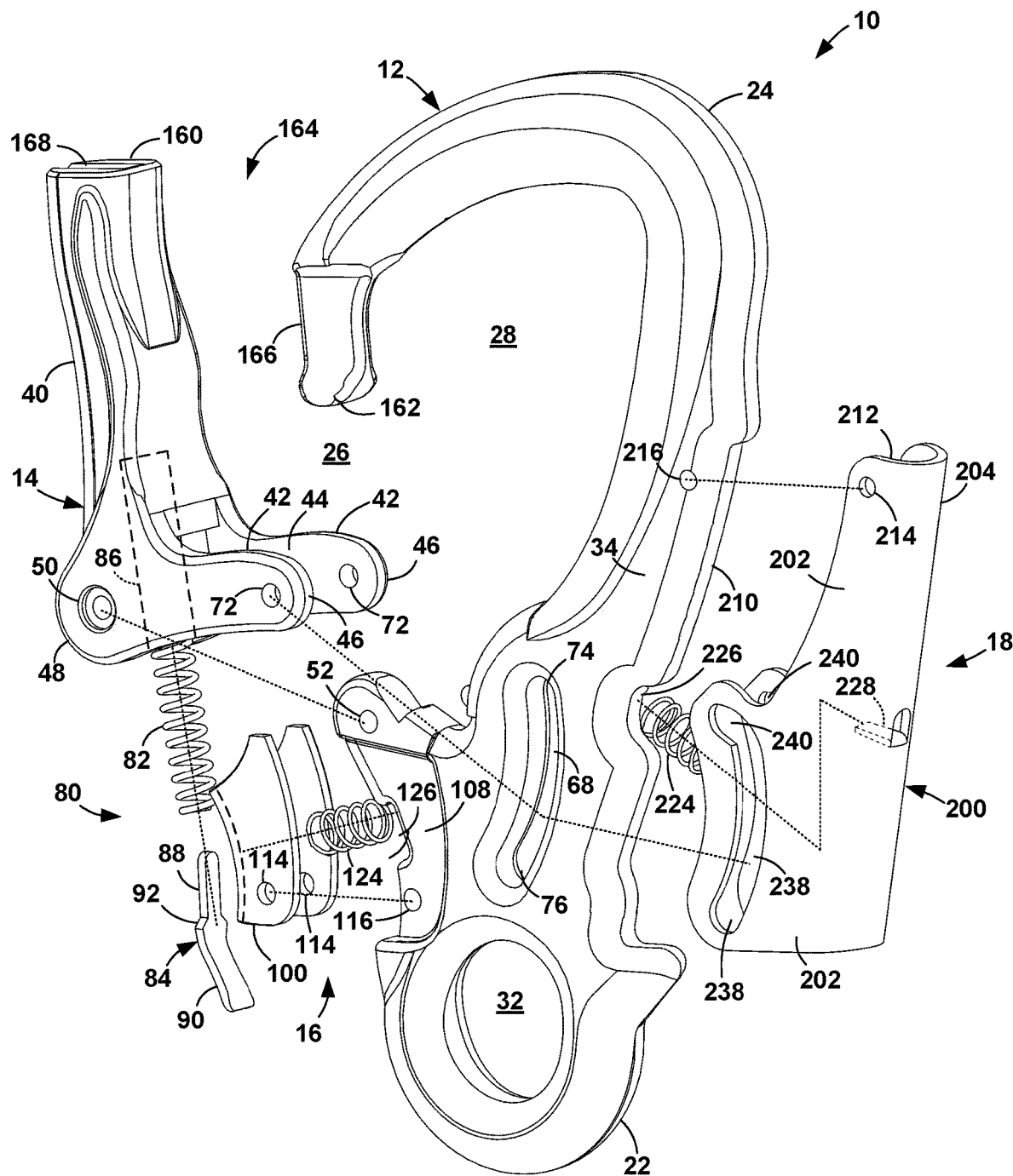
FIG. 3 is an exploded, rear lock side, perspective view of the snap hook.

The body 12 has a base 22 with a hook 24, as shown in FIGS. 2 and 3. The hook 24 extends away from the body 12 and curves into a J shape with a free end 162. The gap between the free end 162 and the base 22 is the opening 26 into the interior 28 of the hook 24. Optionally, the base 22 has a ring 32 or other means for attaching other devices. The body 12 has a number of features that are described below with reference to the gate 14, front lock 16, and rear lock 18.

Figure 6:
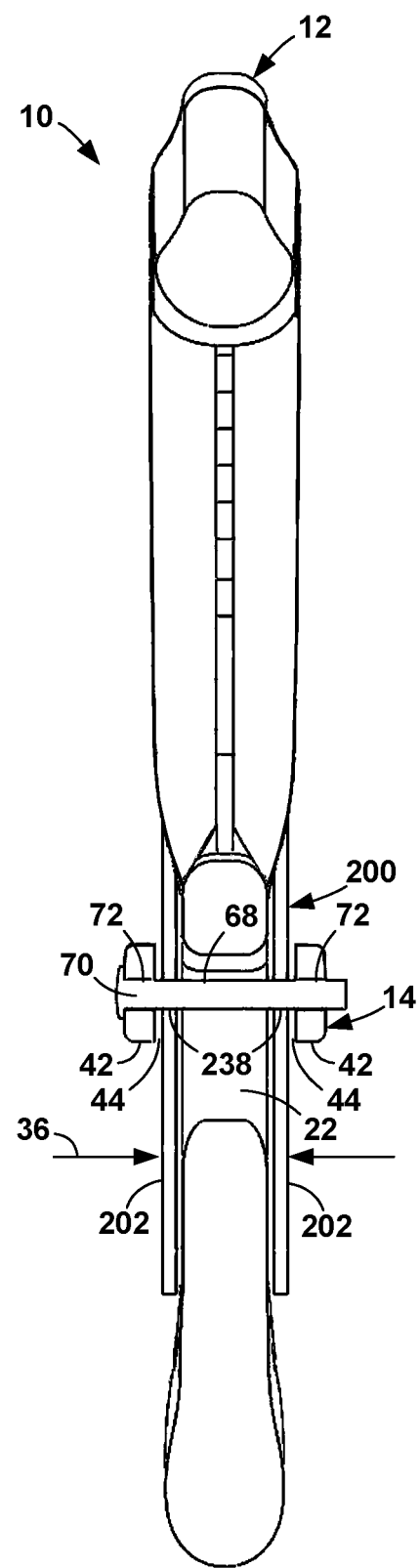
FIG. 6 is an edge, cross-sectional view through the gate stop pin at 6-6 in FIG. 4.

The gate 14 is an elongated arm 40 with a pair of parallel fingers 42 extending generally perpendicularly (90°±10°) from the pivot end 48 of the arm 40. The fingers 42 are spaced apart to form a gap 44 from the arm 40 to the free ends 46 of the fingers 42. The width of the gap 44 is larger than the combined thickness 36 of the base 22 and the thickness of the rear lock side walls 202, described below, so that the fingers 42 straddle the base 22 and rear lock side walls 202, as can be seen in FIGS. 1 and 6.

Figure 5:
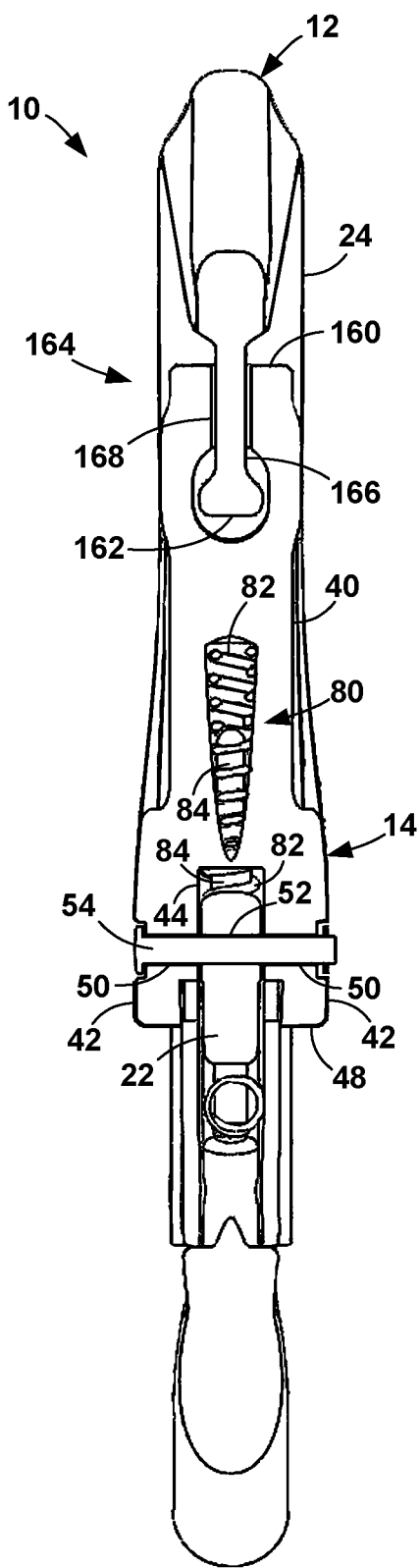
FIG. 5 is an edge, cross-sectional view through the gate pivot pin and the arm/hook interlock at 5-5 in FIG. 4.

Coaxial gate pivot holes 50 extend through the pivot end 48 of the arm 40 and a base pivot hole 52 aligned with the gate pivot holes 50 extends through the front of the base 22. A gate pivot pin 54 fits into and is secured in the pivot holes 50, 52, as in FIG. 5.

Figure 14:
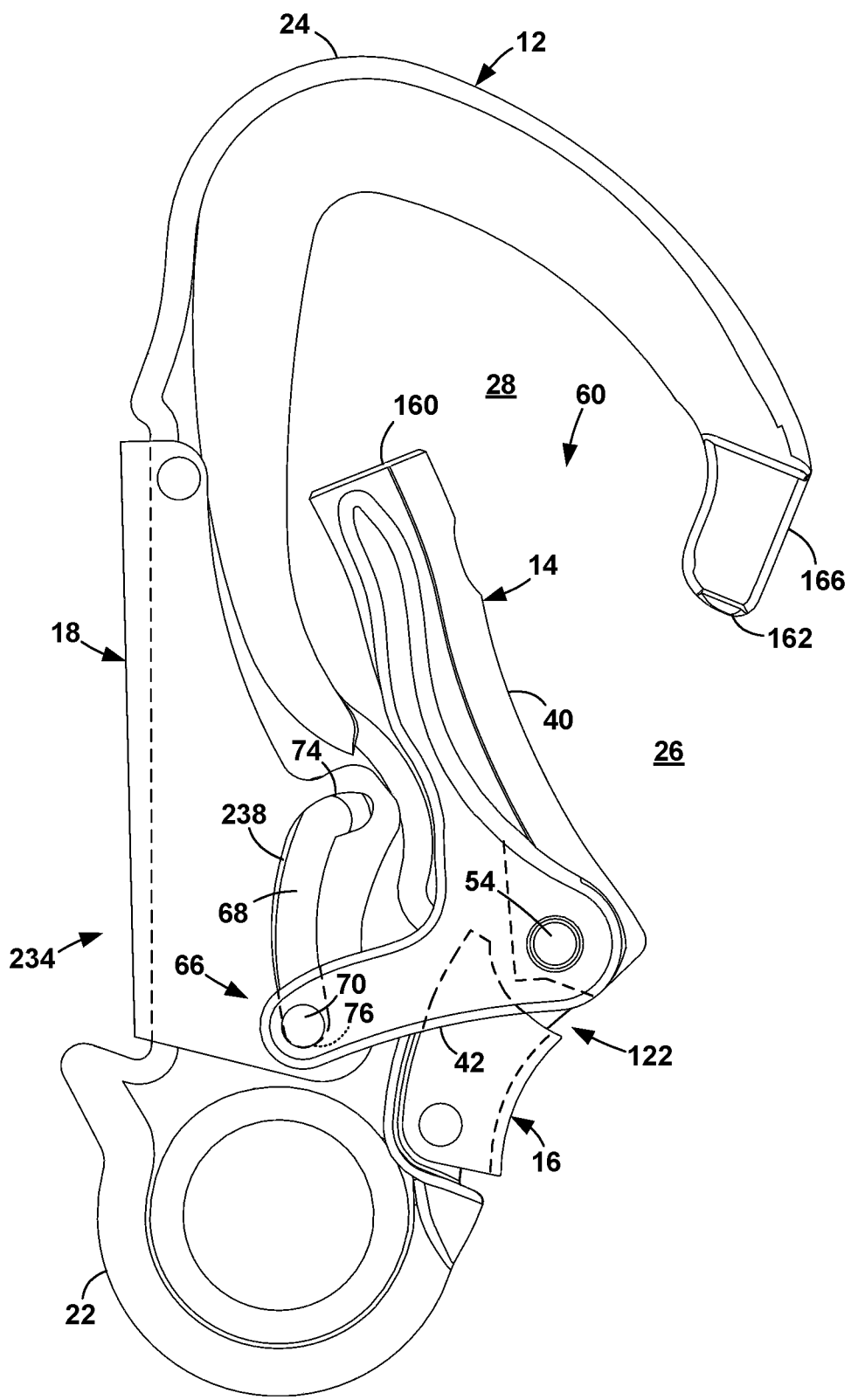
FIG. 14 is a partial phantom, side view of the snap hook in the open position.

The gate 14 pivots on the pivot pin 54 between a closed stop 64 and an open stop 66. The closed stop 64 and opened stop 66 are at the ends 74, 76 of a curved slot 68 in the base 22. As shown in FIG. 6, a stop pin 70 spans the finger gap 44 and anchors in coaxial holes 72 adjacent to the free ends 46 of the gate fingers 42. The stop pin 70 extends through the base curved slot 68 and curved slots 238 in the rear lock side walls 202, described below. As the gate 14 pivots, the fingers 42 slide over each side of the body 22 and the stop pin 70 slides within the curved slots 68, 238. When the stop pin 70 abuts the closed stop end 74 of the curved slot 68, the gate 14 is in the closed position wherein the arm 40 spans the opening 26, as at 58 in FIG. 4. When the stop pin 70 abuts the open stop end 76 of the curved slot 68, the gate 14 is in the open position wherein the arm 40 is within the hook interior 28, as at 60 in FIG. 14.

When in the gate 14 is in the closed position 58, the free end 160 of the arm 40 and the end 162 of the hook optionally interlock to, in part, prevent side-to-side motion of the free end 160 relative to the hook end 162. There are a number of methods known in the art to form an interlock 164. In the present design, a tab 166 extending from the hook end 162 into the body opening 26 fits into a longitudinal slot 168 in the free end 160 of the arm 40, as in FIGS. 1 and 5.

A gate spring assembly 80, shown in FIGS. 2 and 3, biases the gate 14 to the closed position 58. Any type of spring can be used. The present design uses what is known in the industry as a spring and lever. A coil spring 82 fits in a closed bore 86 in the arm 40. The narrow portion 88 of a lever 84 extends into the spring 82 and the wide portion 90 of the lever 84 rests on the base 22. When the gate 14 is opened, the lever 84 is pushed into the bore 86, where the shoulder 92 between the narrow portion 88 and wide portion 90 compresses the spring 82.

Alternatively, a torsion spring can be used. One end of the torsion spring abuts the base 22, the other end abuts the gate 14, and the is coil mounted around the pivot pin 54.

Figure 7:
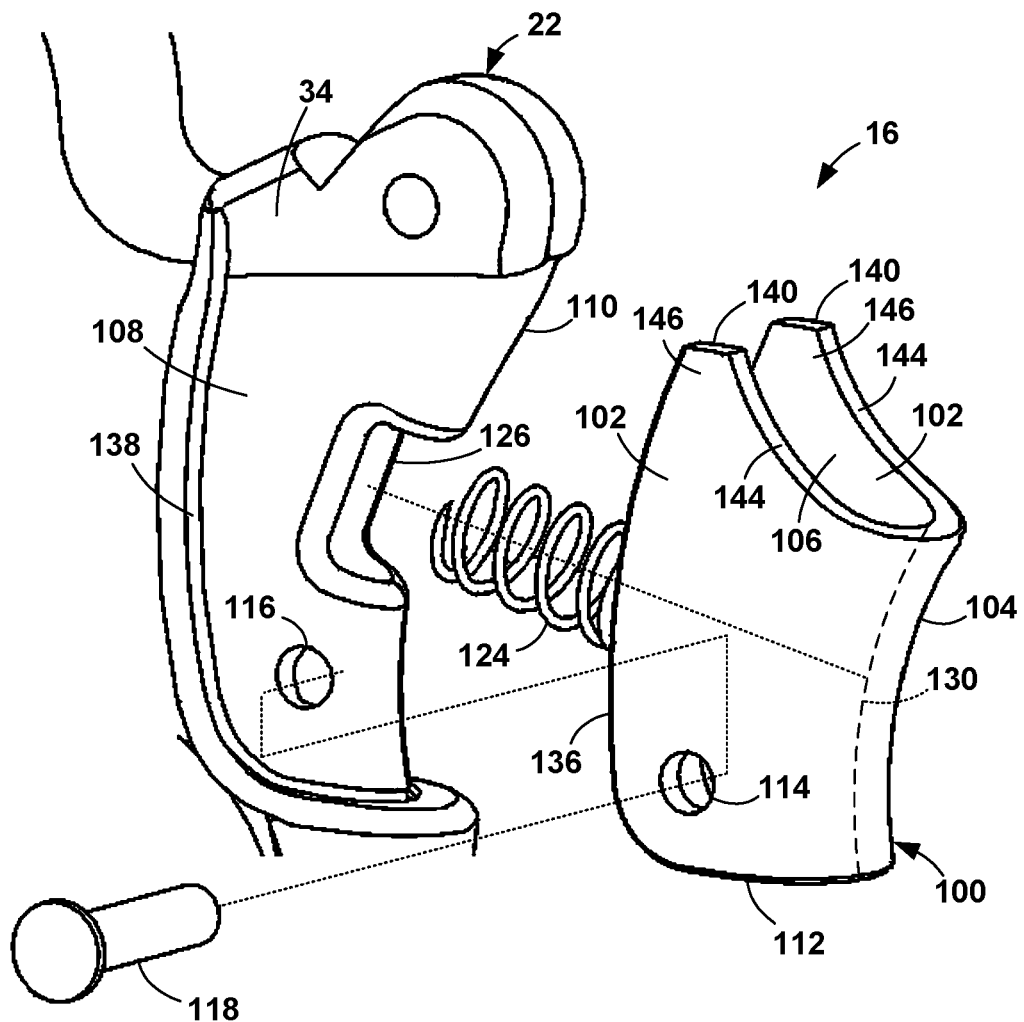
FIG. 7 is an exploded, front lock side, perspective view of the front lock.

The front lock 16 prevents the gate 14 from opening inadvertently. The front lock 16, shown in FIGS. 7 and 8, has a body 100 that is a sheet of rigid material formed into a U shape with two parallel front lock side walls 102 with a gap 106 therebetween, and a rounded front lock push wall 104 connecting the front lock side walls 102 on one edge. Optionally, the front lock push wall 104 is shaped to follow the curve of the base 22.

The gap 106 has a width such that the front lock 16 fits over the sides 34 of the base 22, that is, the front lock side walls 102 straddle the sides 34 at the front of the base 22. When the gate 14 pivots, the gate finger gap 44 slides over the front lock 16 as it slides over the base 22.

Optionally, the front lock side walls 102 reside in shallow depressions 108 that are deep enough that the front lock side walls 102 are either flush with or depressed from the sides 34 of the base 22. This arrangement makes the front lock body 100 narrower so that the gate finger gap 44 can be narrower.

Figure 8:
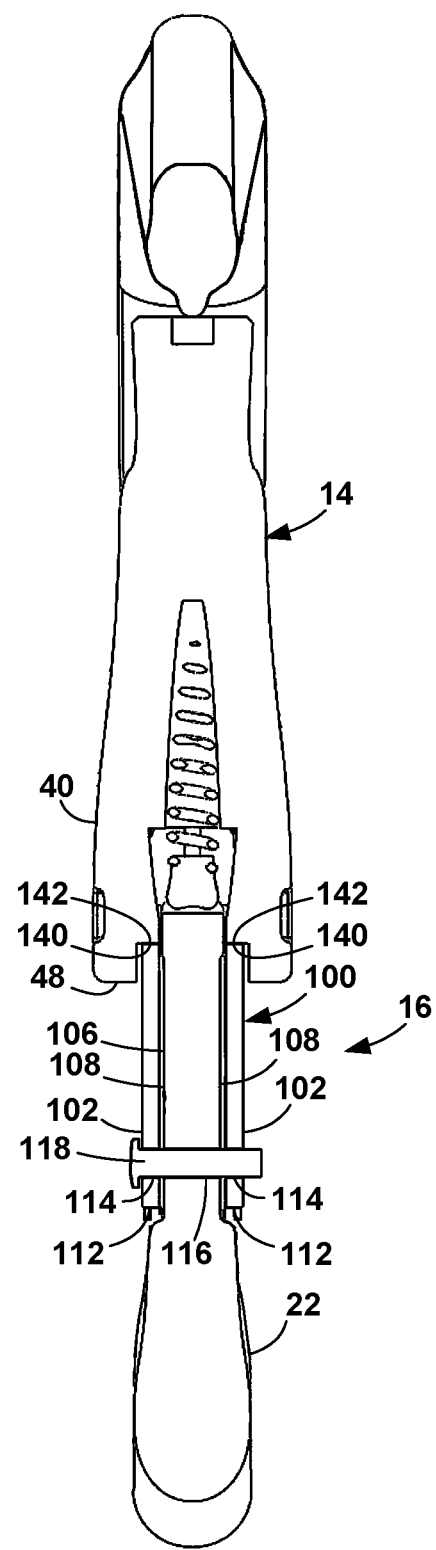
FIG. 8 is an edge, cross-sectional view through the front lock pivot pin at 8-8 in FIG. 4.

Coaxial pivot holes 114 extend through the front lock side walls 102 adjacent to the bottom edge 112 of the front lock side walls 102. The pivot holes 114 are aligned with a pivot hole 116 in the base 22. A front lock pivot pin 118 fits into and is secured in the pivot holes 114, 116, as shown in FIG. 8.

Figure 9:
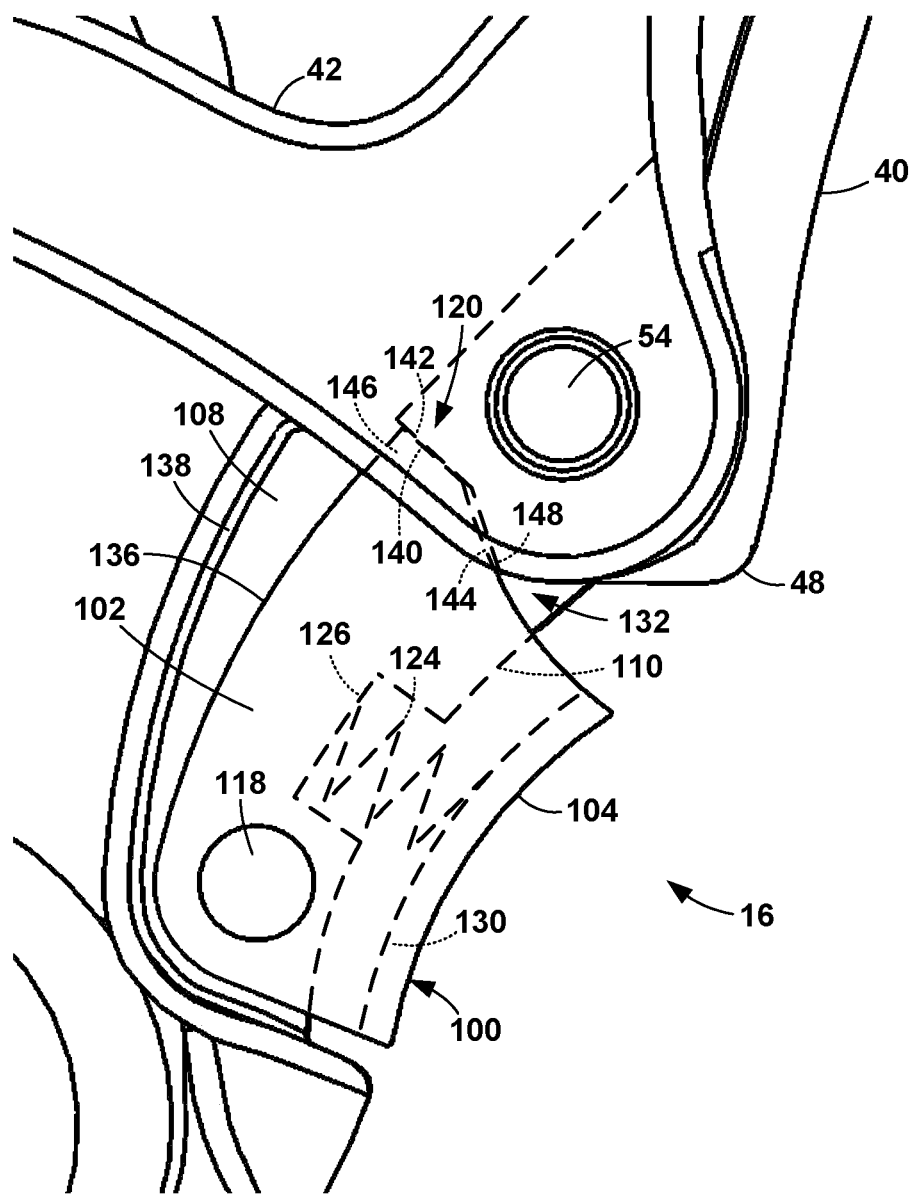
FIG. 9 is a partial phantom, detail, side view of the front lock in the locked position.
Figure 10:
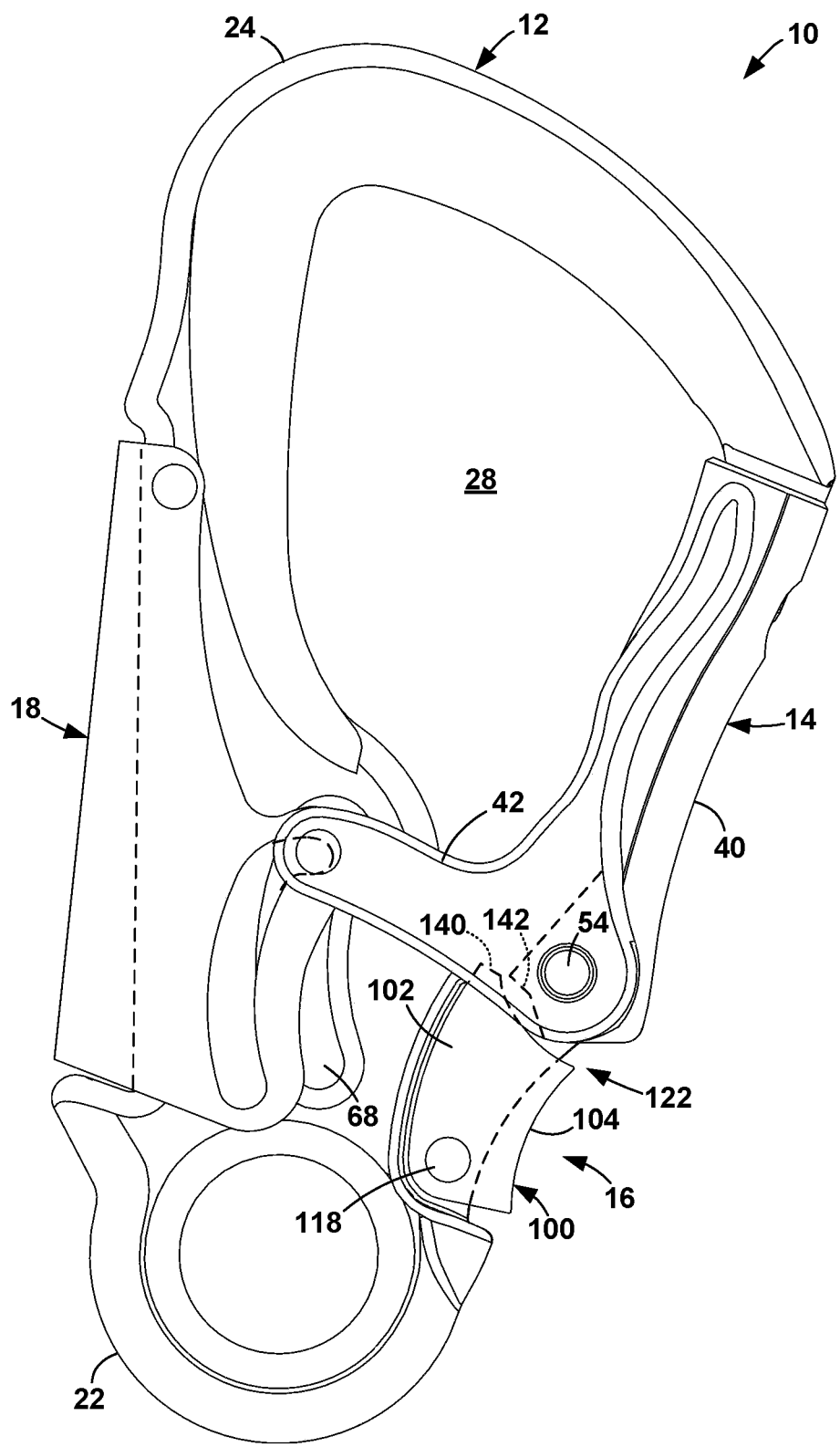
FIG. 10 is a partial phantom, side view of the snap hook with the front lock in the unlocked position.

The front lock 16 pivots on the pivot pin 118 between a front lock stop 132 and a front unlock stop 134. At the lock stop 132, the front lock 16 is in a front locking position, as at 120 in FIGS. 4 and 9. At the unlock stop 134, the front lock 16 is in a front unlocking position, as at 122 in FIGS. 10 and 11. The front lock stop 132 is described below.

In one configuration, the inside 130 of the front lock push wall 104 hitting the edge 110 of the base 22 forms the front unlock stop 134. More specifically, when the front lock 16 is pushed to the base 22, the inside 130 of the front lock push wall 104 hits the front edge 110 of the base 22, preventing the front lock 16 from pivoting further.

In another configuration, the leading edges 136 of the front lock side walls 102 hitting the edge 138 of the depression 108 forms the front unlock stop 134.

A front lock spring biases the front lock 16 to the front locking position 120. Any type of spring can be used. In the present design, a coil spring 124 extends between a notch 126 in the base 22 and the inside 130 of the front lock push wall 104. The spring 124 is compressed when the front lock 16 is pressed to the front unlocking position 122 and, when pressure is released, the spring 124 biases the front lock 16 to the front locking position 120.

Alternatively, a torsion spring mounted to the pivot pin 118 can be used to bias the front lock 16 to the front locking position 120.

When in the front locking position 120, the front lock 16 prevents the gate 14 from pivoting out of the closed position 58. When the gate 14 is in the closed position 58 and the front lock 16 is in the front locking position 120, a locking edge 140 of each front lock side wall 102 that is on the opposite side of the front lock body 100 from the pivot pin 118 is aligned with a shoulder 142 within the gate 14, as in FIG. 9. When an attempt is made to push the gate 14 to the open position 60, the shoulders 142 engage with the locking edges 140, thereby preventing the gate 14 from pivoting.

Figure 11:
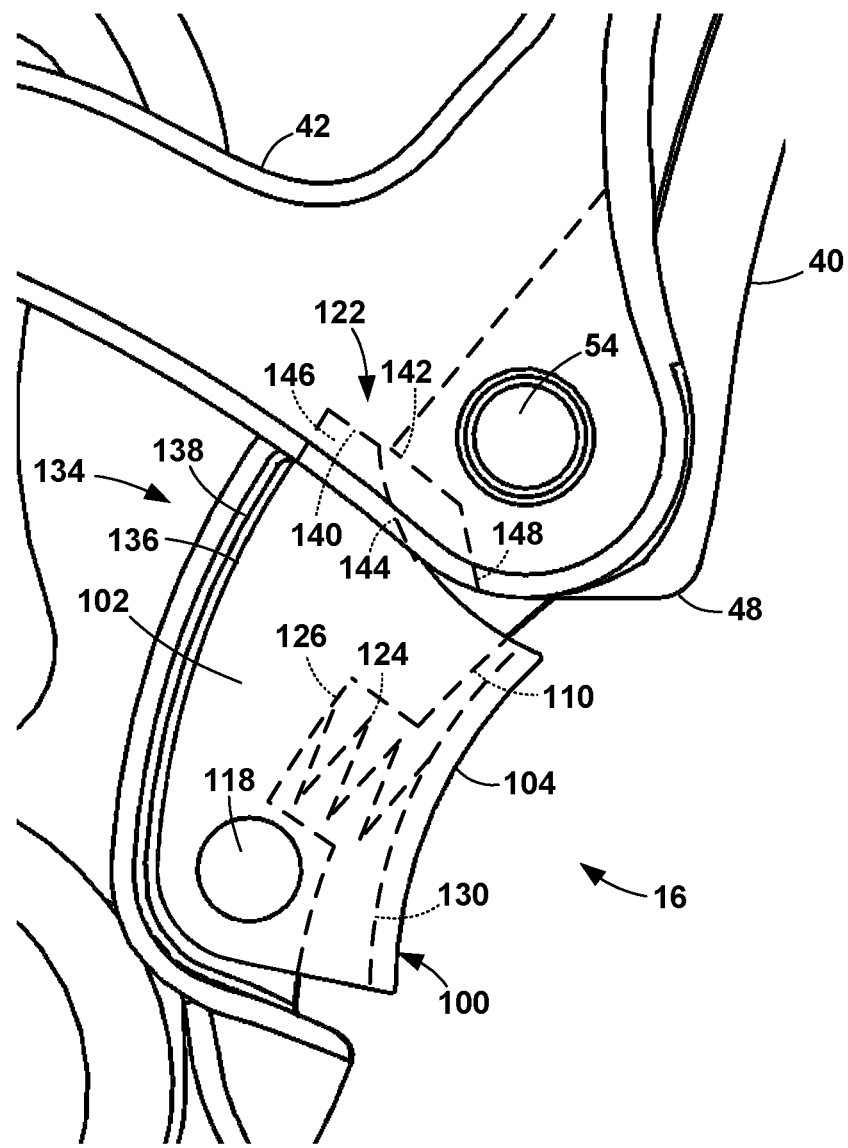
FIG. 11 is a partial phantom, detail, side view of the front lock in the unlocked position.

When the front lock 16 is pushed to the front unlocking position 122, the locking edges 140 are no longer aligned with and are disengaged from the shoulders 142, as in FIG. 11, and the front lock 16 no longer prevents the gate 14 from pivoting to the open position 60.

In order to provide clearance for the gate 14 to pivot, the locking edges 140 of the front lock side walls 102 are beveled, as at 144. The bevel 144 forms a tab 146 with the locking edge 140 that engages the gate shoulder 142.

The front lock stop 132 prevents the front lock body 100 from pivoting away from the base 22. The bevel 144 on the locking edge 140 engages with a feature 148 within the gate 40, as in FIG. 9, to stop further pivoting of the front lock body 100.

Independently from the front lock 16, the rear lock 18 prevents the gate 14 from opening inadvertently. As shown in FIGS. 2 and 3, the rear lock 16 has an elongated body 200 that is a sheet of rigid material formed into two parallel rear lock side walls 202 with a rounded rear lock push wall 204 connecting the side walls 202 on one edge. The rear lock push wall 204 is generally straight.

The rear lock side walls 202 are spaced apart such that the rear lock body 200 fits over the sides 34 of the rear of the base 22 and hook 24 and within the gate finger gap 44.

Coaxial pivot holes 214 extend through the rear lock side walls 202 adjacent to the top edge 212 of the rear lock side walls 202. The pivot holes 214 are aligned with a pivot hole 216 in the rear of the hook 24. A rear lock pivot pin 218 fits into and is secured in the pivot holes 214, 216.

Figure 4:
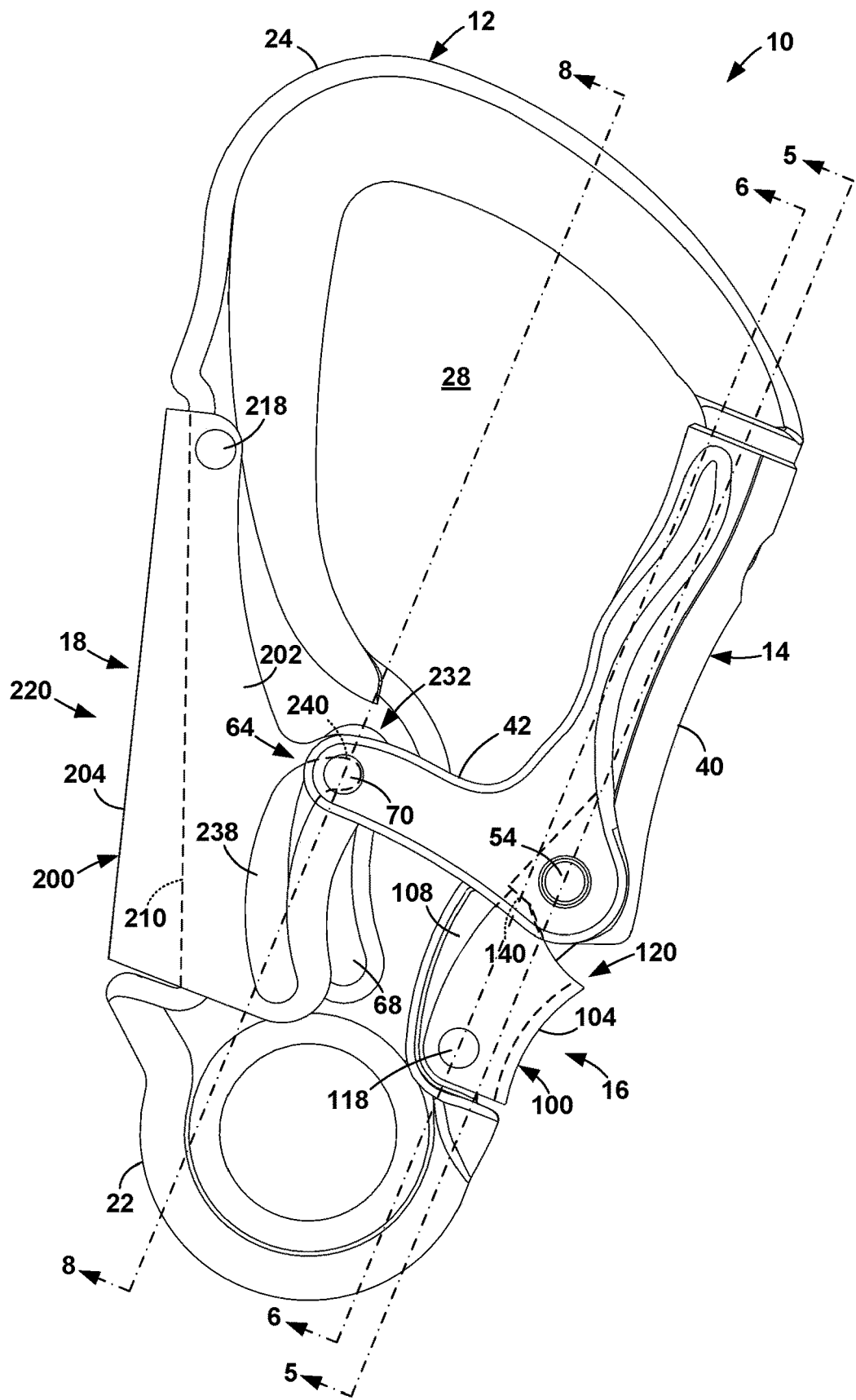
FIG. 4 is a partial phantom, side view of the snap hook in the closed position.
Figure 12:
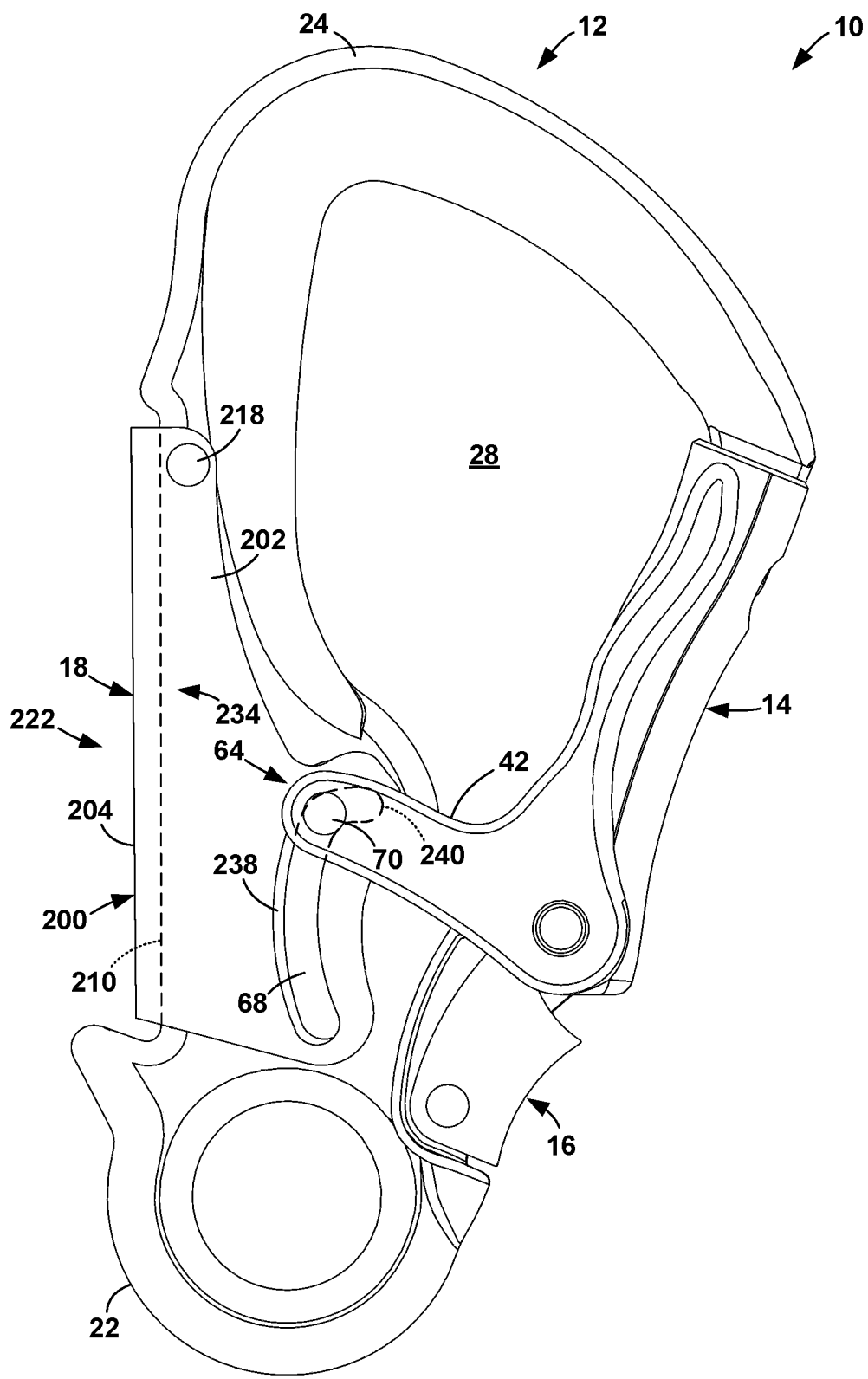
FIG. 12 is a partial phantom, side view of the snap hook with the rear lock in the unlocked position.

The rear lock 18 pivots on the pivot pin 218 between a rear locking position 220, as at 220 in FIG. 4, and a rear unlocking position 222, as at 222 in FIG. 12. A rear lock spring 224 biases the rear lock 18 to the rear locking position 220. Any type of spring can be used. In the present design, a coil spring 224 extends between a notch 226 in the base 22 and tab 228 inside of the push lock rear wall 204 spaced from the pivot pin 218. The spring 224 is compressed when the rear lock 18 is pressed to the rear unlocking position 222 and, when pressure is released, the spring 224 biases the rear lock 18 back to the rear locking position 220. Alternatively, a torsion spring mounted on the pivot pin 218 can be used.

The rear lock 18 is in the rear locking position 220 when the rear lock body 200 reaches a lock stop 232 and is in the rear unlocking position 222 when the rear lock body 200 reaches an unlock stop 234. The lock stop 232 is described below. The unlock stop 234 can take one of several configurations. In a first configuration, the inside of the rear lock push wall 204 hitting the edge 210 of the base 22 forms the unlock stop 234. In other words, when the rear lock 18 is pushed to the base 22, the inside of the rear lock push wall 204 hits the edge 210 of the base 22, preventing the rear lock 18 from pivoting further.

In a second configuration of the unlock stop 234, when the spring 224 is fully compressed, the rear lock body 200 cannot be pushed any farther, thus reaching the unlock stop 234.

In a third configuration of the unlock stop 234, the tab 228 on the rear lock body 200 on which the spring 224 is mounted pushes through the center of the spring 224 until it touches the edge 210 of the base 22 within the spring notch 226. When this occurs, the rear lock body 200 cannot be pushed any farther, thus reaching the unlock stop 234.

When in the rear locking position 220, the rear lock 18 prevents the gate 14 from pivoting out of the closed position 58. The rear lock side walls 202 of the rear lock 18 have coaxial curved slots 238 with an inward notch 240 at the end closest to the hook 24. When the rear lock 18 is in the rear locking position 220, only the notches 240 in the rear lock curved slots 238 are aligned with the closed stop end 74 of the base curved slot 68, as in FIG. 4. Because the gate stop pin 70 extends through both the base curved slot 68 and the rear lock curved slot notches 240, when the curved slots 68, 238 are not aligned, the gate stop pin 70 is trapped at the closed stop end 74 and the slot notches 240.

This arrangement also acts as the lock stop 232 for the rear lock 18 because the stop pin 70 through the rear lock curved slots 238 keeps the rear lock 18 from being pushed farther from the base 22 by the rear lock spring 224.

When the rear lock 18 is in the rear unlocking position 222, the rear lock curved slots 238 align with the base curved slot 68. In this position, the stop pin 70 can slide within the slots 68, 238 and the gate 14 is not prevented from pivoting to the open position.

Figure 13:
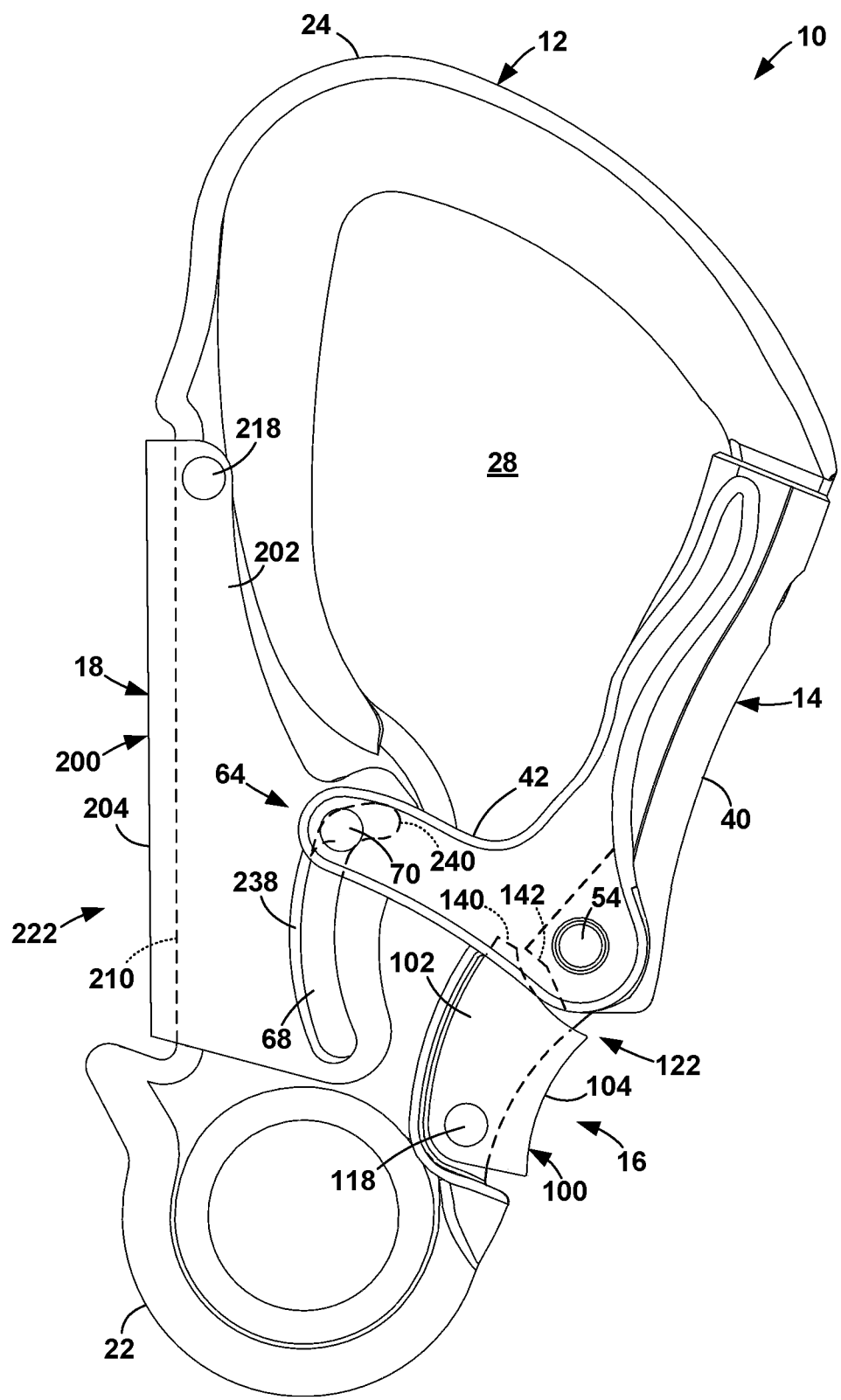
FIG. 13 is a partial phantom, side view of the snap hook with both locks in the unlocked position.

In order to open the gate 14, the front lock 16 must be in the front unlocking position 122 and the rear lock 18 must be in the rear unlocking position 234, as in FIG. 13.

Thus, it has been shown and described a double lock snap hook. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A double locking snap hook comprising:
    (a) a body having a base with a front, a rear, and sides, and a hook extending from the rear of the base to a hook free end and forming an interior with an opening between the hook free end and the front of the base;
    (b) a gate having an arm with an arm free end and a pivot end, a pair of parallel fingers extending generally perpendicularly toward the rear from the pivot end to a finger free end with a finger gap between the fingers, a stop pin extending through the finger gap between the fingers and through a base curved slot in the base within the finger gap, the gate mounted to the base to pivot between a closed position wherein the arm extends across the opening and the stop pin is at a closed stop end of the curved slot, and an open position wherein the arm extends into the interior and the stop pin is at an open stop end of the base curved slot;
    (c) a front lock mounted to the front of the base to pivot between a front locking position wherein a locking edge on the front lock engages a shoulder on the gate thereby preventing the gate from pivoting from the closed position, and a front unlocking position wherein the edge is disengaged from the shoulder thereby not preventing the gate from pivoting to the open position; and
    (d) a rear lock mounted to the rear of the hook to pivot between a rear locking position where at least one rear lock curved slot through which the stop pin extends is not aligned with the base curved slot thereby retaining the stop pin at the closed stop end of the base curved slot, and a rear unlocking position where the rear lock curved slot is aligned with the base curved slot thereby permitting the stop pin to slide in the base curved slot and not preventing the gate from pivoting to the open position;

(e) whereby, when the front lock is in the front unlocking position and the rear lock is in the rear unlocking position, the gate can pivot to the open position.

2. The double locking snap hook of claim 1 further comprising an interlock between the arm free end and the hook free end when the gate is in the closed position.

3. The double locking snap hook of claim 1 further comprising a spring biasing the gate to the closed position.

4. The double locking snap hook of claim 1 wherein the front lock has a U-shaped body with front lock side walls connected by a front lock push wall, the front lock side walls straddling the sides of the base such that the fingers slide over the front lock side walls when the gate is pivoting between the open position and closed position, the front lock push wall being adapted to be manually pushed to move the front lock from the front locking position to the front unlocking position.

5. The double locking snap hook of claim 4 wherein the front lock body is mounted to pivot about a front lock pivot pin extending through the base and front lock body opposite the locking edge.

6. The double locking snap hook of claim 4 wherein the front lock side walls reside in depressions in the sides of the base.

7. The double locking snap hook of claim 1 further comprising a front lock spring biasing the front lock to the front locking position.

8. The double locking snap hook of claim 1 wherein the rear lock has a U-shaped body with rear lock side walls connected by a rear lock push wall, the rear lock side walls straddling the base and wherein the at least one rear lock curved slot is a rear lock curved slot in each rear lock side wall, the rear lock push wall being adapted to be manually pushed to move the rear lock from the rear locking position to the rear unlocking position.

9. The double locking snap hook of claim 1 further comprising a rear lock spring biasing the rear lock to the rear locking position.

\* \* \* \* \*